United States Patent
Rhee et al.

(10) Patent No.: US 11,868,428 B2
(45) Date of Patent: Jan. 9, 2024

(54) APPARATUS AND METHOD WITH COMPRESSED NEURAL NETWORK COMPUTATION

(71) Applicants: Samsung Electronics Co., Ltd., Suwon-si (KR); Seoul National University R&DB Foundation, Seoul (KR)

(72) Inventors: Seon Min Rhee, Seoul (KR); Jaekyeom Kim, Seoul (KR); Gunhee Kim, Seoul (KR); Minjung Kim, Seoul (KR); Dongyeon Woo, Seoul (KR); Seungju Han, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 253 days.

(21) Appl. No.: 17/340,134

(22) Filed: Jun. 7, 2021

(65) Prior Publication Data

US 2022/0027668 A1    Jan. 27, 2022

(30) Foreign Application Priority Data

Jul. 21, 2020   (KR) .................. 10-2020-0090420
Dec. 1, 2020    (KR) .................. 10-2020-0166049

(51) Int. Cl.
*G06V 10/40*      (2022.01)
*G06F 18/211*     (2023.01)
(Continued)

(52) U.S. Cl.
CPC .......... *G06F 18/211* (2023.01); *G06F 18/214* (2023.01); *G06F 18/22* (2023.01);
(Continued)

(58) Field of Classification Search
CPC ...... G06F 18/211; G06F 18/214; G06F 18/22; G06F 21/34; G06F 21/30; G06N 3/08;
(Continued)

(56) References Cited

U.S. PATENT DOCUMENTS

2014/0279777 A1\*  9/2014  Cornebise .............. G06N 3/045
                                                            706/22
2016/0123943 A1\*  5/2016  Li ........................... G06N 3/084
                                                            702/31
(Continued)

OTHER PUBLICATIONS

Shen et al., "CS-CNN: Enabling Robust and Efficient Convolutional Neural Networks Inference for Internet-of-Things Applications", IEEE (Year: 2018).\*

(Continued)

*Primary Examiner* — Aaron W Carter
(74) *Attorney, Agent, or Firm* — NSIP Law

(57) ABSTRACT

A neural network includes a drop layer configured to drops feature values. A method of computation using the neural network includes extracting feature data from input data using a first portion of a neural network, generating compressed representation data of the extracted feature data by dropping a feature value from the extracted feature data at a drop layer of the neural network based on a drop probability corresponding to the feature value, and indicating an inference result from the compressed representation data using a second portion of the neural network.

23 Claims, 11 Drawing Sheets

(51) Int. Cl.
*G06N 3/08* (2023.01)
*G06F 21/34* (2013.01)
*G06F 18/22* (2023.01)
*G06F 18/214* (2023.01)
*G06V 10/74* (2022.01)
*G06V 10/774* (2022.01)
*G06V 10/82* (2022.01)
*G06V 40/16* (2022.01)

(52) U.S. Cl.
CPC ............... *G06F 21/34* (2013.01); *G06N 3/08* (2013.01); *G06V 10/40* (2022.01); *G06V 10/74* (2022.01); *G06V 10/774* (2022.01); *G06V 10/82* (2022.01); *G06V 40/172* (2022.01)

(58) Field of Classification Search
CPC .......... G06N 3/04; G06N 3/082; G06V 10/40; G06V 10/74; G06V 10/774; G06V 10/82; G06V 40/172; G06V 10/764
See application file for complete search history.

(56) References Cited

U.S. PATENT DOCUMENTS

| | | | |
|---|---|---|---|
| 2018/0174047 A1 | 6/2018 | Bourdev et al. | |
| 2018/0198994 A1* | 7/2018 | Cardinaux | H04N 23/80 |
| 2018/0276454 A1* | 9/2018 | Han | G06V 40/172 |
| 2019/0096659 A1* | 3/2019 | Xu | G06F 9/30003 |
| 2019/0258937 A1 | 8/2019 | Alemi | |
| 2019/0340497 A1* | 11/2019 | Baraniuk | G06N 3/045 |
| 2019/0347523 A1 | 11/2019 | Rothberg et al. | |
| 2020/0026928 A1* | 1/2020 | Rhodes | G06T 7/194 |
| 2020/0104679 A1 | 4/2020 | van den Oord et al. | |
| 2020/0298873 A1* | 9/2020 | Provost | G10L 15/22 |
| 2020/0311548 A1* | 10/2020 | Shrivastava | G06F 17/15 |
| 2021/0089925 A1* | 3/2021 | Partovi Nia | G06N 3/084 |
| 2021/0150331 A1* | 5/2021 | Inoue | G06N 3/045 |
| 2021/0209405 A1* | 7/2021 | Zhang | G06V 10/82 |
| 2021/0390413 A1* | 12/2021 | Spanias | G06N 3/04 |
| 2022/0027668 A1* | 1/2022 | Rhee | G06N 3/04 |
| 2022/0075383 A1* | 3/2022 | Morad | G06V 20/56 |
| 2023/0030610 A1* | 2/2023 | Abe | G06F 21/32 |
| 2023/0057444 A1* | 2/2023 | Djukic | G06N 3/08 |

OTHER PUBLICATIONS

Baraniuk, Richard; "Compressive Sensing" IEEE Signal Processing Magazine [118] Jul. 2007 (Year: 2007).*

Tishby, Naftali et al., "The Information Bottleneck Method." *arXiv preprint physics*/0004057, 2000 (pp. 1-16).

Tishby, Naftali et al., "Deep Learning and the Information Bottleneck Principle." *2015 IEEE Information Theory Workshop (ITW)*. IEEE, 2015 (pp. 1-5).

Alemi, Alexander A., et al., "Deep Variational Information Bottleneck." *arXiv preprint arXiv*:1612.00410, 2016 (pp. 1-19).

Strouse, D. J., et al., "The deterministic information bottleneck," *Neural computation*, 29, 6, Dec. 19, 2016 (pp. 1611-1630).

Pathak, Deepak, et al. "Curiosity-Driven Exploration by Self-Supervised Prediction." *International Conference on Machine Learning. PMLR*, 2017 (pp. 1-10).

Savinov, Nikolay, et al., "Episodic Curiosity Through Reachability." *arXiv preprint arXiv*:1810.02274, 2018 (pp. 1-20).

Igl, Maximilian, et al., "Generalization in Reinforcement Learning with Selective Noise Injection and Information Bottleneck." *arXiv preprint arXiv*:1910.12911, 2019 (pp. 1-13).

Kim, Youngjin, et al. "Curiosity-Bottleneck: Exploration by Distilling Task-Specific Novelty," *International Conference on Machine Learning. PMLR*, 2019 (pp. 1-10).

"Drop-Bottleneck: Learning Discrete Compressed Representation for Noise-Robust Exploration", Ninth International Conference on Learning Representations, 2021 (pp. 1-10).

\* cited by examiner

| Method | VizDoom | | | | | | | | | DMLab | | | | | | | | |
|---|---|---|---|---|---|---|---|---|---|---|---|---|---|---|---|---|---|---|
| | Dense | | | Sparse | | | Very sparse | | | Sparse | | | | Very sparse | | |
| | IA | N | NA | IA | N | NA | IA | N | NA | IA | N | NA | IA | N | NA |
| PPO | 1.00 | 1.00 | 1.00 | 0.00 | 0.00 | 0.00 | 0.00 | 0.00 | 0.00 | 8.5 | 11.6 | 9.8 | 6.3 | 8.7 | 6.1 |
| PPO+ICM | 0.87 | 1.00 | 1.00 | 0.00 | 0.50 | 0.40 | 0.00 | 0.73 | 0.20 | 6.9 | 7.7 | 7.6 | 4.9 | 6.0 | 5.7 |
| PPO+EC | - | - | - | - | - | - | - | - | - | 13.1 | 18.7 | 14.8 | 7.4 | 13.4 | 11.3 |
| PPO+ECO | 0.71 | 0.81 | 0.72 | 0.21 | 0.70 | 0.33 | 0.19 | 0.79 | 0.50 | 18.5 | 28.2 | 18.9 | 16.8 | 26.0 | 12.5 |
| PPO+Drop-bottleneck | 1.00 | 1.00 | 1.00 | 0.71 | 0.90 | 0.80 | 0.85 | 0.90 | 0.90 | 30.8 | 35.3 | 30.2 | 27.2 | 25.6 | 24.5 |

APPARATUS AND METHOD WITH COMPRESSED NEURAL NETWORK COMPUTATION

CROSS-REFERENCE TO RELATED APPLICATIONS

This application claims the benefit under 35 USC § 119(a) of Korean Patent Application No. 10-2020-0090420, filed on Jul. 21, 2020, and Korean Patent Application No. 10-2020-0166049, filed on Dec. 1, 2020, in the Korean Intellectual Property Office, the entire disclosures of which are incorporated herein by reference for all purposes.

BACKGROUND

Field

The following description relates to a compressed representation of neural network computation.

Description of Related Art

A neural network or an artificial neural network (ANN) may generate mapping between input patterns and output patterns, and may have a generalization capability to generate a relatively correct output with respect to an input pattern that has not been used for training.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method, the method including extracting feature data from input data using a first portion of a neural network, generating compressed representation data of the extracted feature data by dropping a feature value from the extracted feature data at a drop layer of the neural network based on a drop probability corresponding to the feature value, and indicating an inference result from the compressed representation data using a second portion of the neural network.

The drop probability may be assigned based on a relevance to a target task.

The generating of the compressed representation data may include dropping a first feature value of the extracted feature data based on a first drop probability of the drop layer, and dropping a second feature value of the extracted feature data based on a second drop probability of the drop layer, and the first drop probability being different than the second drop probability.

The first drop probability may be determined to be greater than the second drop probability in response to the first feature value not being relevant to a target task for the input data and the second feature value being relevant to the target task.

The generating of the compressed representation data may include determining whether to drop each feature value of the feature data based on a binomial distribution function with a drop probability corresponding to each feature value.

The binomial distribution function may be a Bernoulli distribution function approximated using a sigmoid function that may be differentiable for the drop probability.

The generating of the compressed representation data may include dropping each of a plurality of feature values of the feature data at the drop layer, in response to a drop probability assigned to each of the plurality of feature values meeting a threshold, and preserving each of the plurality of feature values in the drop layer, in response to a drop probability assigned to each of the plurality of feature values failing to meet the threshold.

The generating of the compressed representation data may include adjusting preserved feature values based on a number of feature values dropped from the feature data by the drop layer.

A number of drop probabilities of the drop layer may correspond to a number of dimensions of the feature data.

The generating of the compressed representation data may include adjusting preserved feature values based on a ratio of a number of feature values dropped from the feature data and a number of dimensions of the feature data.

The extracting of the feature data may include receiving an input image and extracting the feature data from the input image, and the indicating of the inference result may include outputting a result of recognizing an object included in the input image.

The outputting of the result of recognizing the object may include unlocking a locked mobile terminal, in response to an object included in the input image matching an object enrolled in the mobile terminal.

The method may include calculating an objective function value using a prediction term based on the compressed representation data and a target task and a compression term based on the feature data and the compressed representation data, and updating a parameter of the drop layer based on the objective function value.

In another general aspect, there is provided a processor-implemented method of training a neural network, the method comprising generating temporary compressed representation data by dropping a feature value of feature data extracted from a training input based on a drop probability corresponding to the feature value using a drop layer of the neural network, calculating an objective function value using a prediction term based on the temporary compressed representation data and a target task and a compression term based on the feature data and the temporary compressed representation data, and updating a parameter of the drop layer based on the objective function value.

The updating of the parameter of the drop layer may include updating the parameter of the drop layer based on a gradient descent scheme to minimize a sum of the prediction term and the compression term The method may include extracting feature data from input data using a first portion of the neural network, generating compressed representation data of the extracted feature data by dropping a feature value from the extracted feature data at the drop layer of the neural network based on a drop probability corresponding to the feature value, and indicating an inference result from the compressed representation data using a second portion of the neural network.

In another general aspect, there is provided a computing apparatus comprising a memory configured to store a neural network comprising a drop layer, and a processor configured to extract feature data from input data using a first portion of the neural network, to generate compressed representation data of the extracted feature data by dropping a feature value from the extracted feature data at the drop layer based on a drop probability corresponding to the feature value, and to indicate an inference result from the compressed representation data using a second portion of the neural network.

The drop probability may be assigned based on a relevance to a target task.

The processor may be configured to drop a first feature value of the extracted feature data based on a first drop probability of the drop layer and to drop a second feature value of the extracted feature data based on a second drop probability, different than the first probability, of the drop layer.

The processor may be configured to determine whether to drop each feature value of the feature data based on a binomial distribution function with a drop probability corresponding to each feature value.

The processor may be configured to drop each of a plurality of feature values of the feature data at the drop layer, in response to a drop probability assigned to each of the plurality of feature values meeting a threshold, and to preserve each of the plurality of feature values in the drop layer, in response to a drop probability assigned to each of the plurality of feature values failing to meet the threshold.

The processor may be configured to adjust preserved feature values based on a number of feature values dropped from the feature data by the drop layer.

The computing apparatus may include a camera configured to receive an input image, wherein the processor may be configured to extract the feature data from the input image, and to output a result of recognizing an object included in the input image.

The computing apparatus is a mobile terminal, and the processor may be configured to unlock the mobile terminal, in response to an object included in the input image matching an object enrolled in the mobile terminal.

Other features and aspects will be apparent from the following detailed description, the drawings, and the claims.

BRIEF DESCRIPTION OF THE DRAWINGS

FIGS. 9 and 10 illustrate examples of performances of a neural network including a drop layer.

Figure 1:
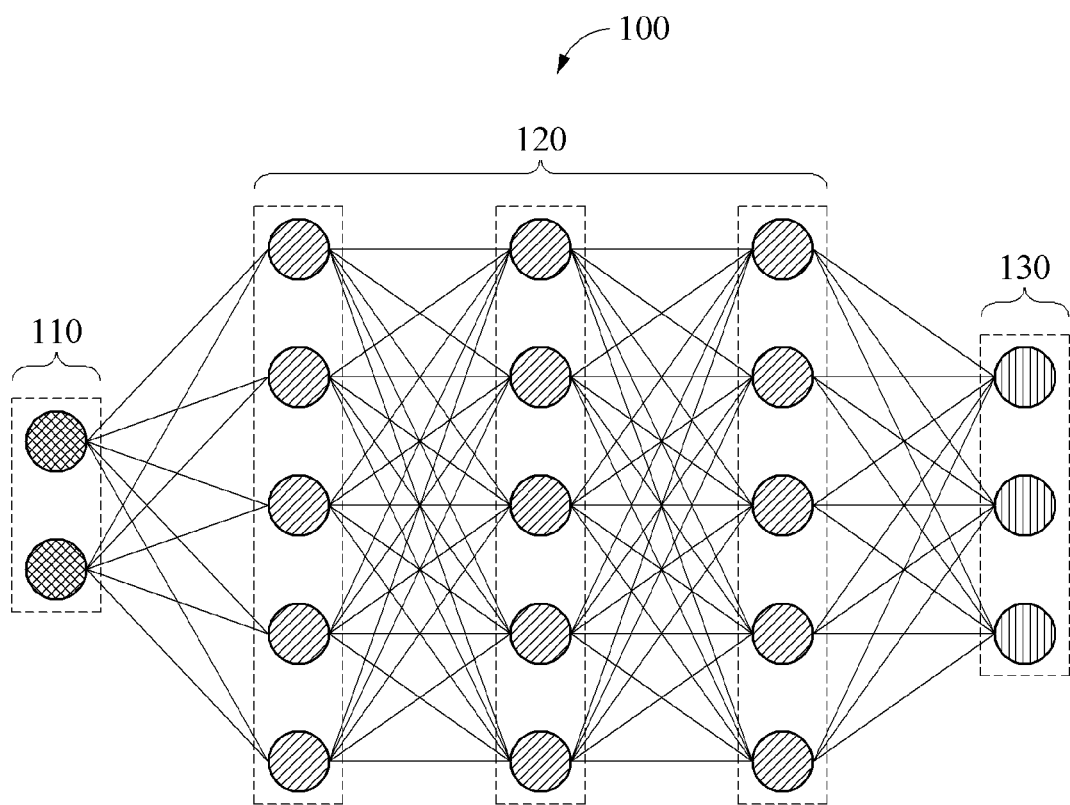
FIG. 1 illustrates an example of a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

Although terms such as first, second, A, B, (a), (b) may be used herein to describe various members, components, regions, layers, or sections, these members, components, regions, layers, or sections are not to be limited by these terms. These terms should be used only to distinguish one member, component, region, layer, or section from another member, component, region, layer, or section. Thus, a first member, component, region, layer, or section referred to in examples described herein may also be referred to as a second member, component, region, layer, or section without departing from the teachings of the examples. The sequences, or the orders of the constituent elements are not limited by these terms.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

Various modifications may be made to the following examples. Here, the examples are not construed as limited to the disclosure and should be understood to include all changes, equivalents, and replacements within the idea and the scope of the disclosure.

The terminology used herein is for the purpose of describing particular examples only and is not to be limiting of the examples. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or a combination thereof, but do not preclude the presence or addition of one or more other features, integers, steps, operations, elements, components, numbers, and/or combinations thereof.

The use of the term "may" herein with respect to an example or embodiment (for example, as to what an example or embodiment may include or implement) means that at least one example or embodiment exists where such a feature is included or implemented, while all examples are not limited thereto.

When describing the examples with reference to the accompanying drawings, like reference numerals refer to like constituent elements and a repeated description related thereto will be omitted. In the description of examples, detailed description of well-known related structures or functions may be omitted when it is deemed that such description will cause ambiguous interpretation of the present disclosure.

FIG. 1 illustrates an example of a neural network 100.

The neural network 100 may be a model with a machine learning structure designed to extract feature data from input data and provide an inference operation based on the feature data. The feature data may be data associated with a feature obtained by abstracting input data. If input data is an image, feature data may be data obtained by abstracting the image and may be represented in a form of, for example, a vector.

The neural network 100 may be an example of a deep neural network (DNN) including a plurality of layers and may be simply referred to as a neural network. The plurality of layers may include an input layer, hidden layers, and an output layer. The DNN may include, for example, any one or any combination of a fully-connected network (FCN), a deep convolutional network (DCN), a recurrent neural network (RNN) a convolutional neural network (CNN), perceptron, feed forward (FF), a radial basis network (RBF), deep feed forward (DFF), a long short term memory (LSTM), a gated recurrent unit (GRU), an autoencoder (AE), a variational autoencoder (VAE), a denoising autoencoder (DAE), a sparse autoencoder (SAE), Markov Chain (MC), a Hopfield network (HN), a Boltzmann machine (BM), a restricted Boltzmann machine (RBM), a Depp belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN). In an example, at least a portion of the plurality of layers in the neural network may correspond to the CNN, and another portion thereof may correspond to the FCN. In this case, the CNN may be referred to as convolutional layers, and the FCN may be referred to as fully connected layers.

The neural network 100 may map input data and output data that are in a nonlinear relationship based on deep learning, to perform object classification, object recognition, speech recognition, or image recognition, as non-limiting example. The deep learning, which is a machine learning method used for tasks such as image or speech recognition from a big data set, may map input data and output data to each other through supervised and/or unsupervised learning.

In the following description, as non-limiting example, recognition may include verification and/or identification of data. The verification may be an operation of determining whether input data is true or false. For example, the verification may be a discrimination operation of determining whether an object (for example, a human face) indicated by an arbitrary input image matches an object indicated by a reference image. In an example, a computing apparatus may verify whether data extracted and acquired from an input image matches data registered in a device, and may determine that verification of a user corresponding to the input image succeeds in response to the above data verified to match the data registered in the device. However, examples are not limited thereto. For example, when a plurality of pieces of registered data are stored in the computing apparatus, a verification apparatus may sequentially verify whether data extracted and acquired from an input image matches each of the plurality of pieces of registered data, or any of the plurality of pieces of registered data.

The identification may be a classification operation of determining which one of a plurality of labels is indicated by input data. For example, each label may indicate a class, for example, an identity (ID) of each registered user. For example, through the identification, whether a user included in input data is a male or female user may be indicated.

Referring to FIG. 1, the neural network 100 may include an input layer 110, a hidden layer 120, and an output layer 130. The input layer 110, the hidden layer 120, and the output layer 130 may each include a plurality of nodes.

Although it is illustrated in FIG. 1 that the hidden layer 120 includes three layers for the convenience of description, the hidden layer 120 may include various numbers of layers. Although it is illustrated in FIG. 1 that the neural network 100 includes a separate input layer to receive input data, in an example, the input data may be input directly to the hidden layer 120. In the neural network 100, nodes of layers other than the output layer 130 may be connected to nodes of a next layer through links for transmitting an output signal. A number of links may correspond to a number of nodes included in the next layer.

For example, for each node included in the hidden layer 120, an output of an activation function associated with weighted inputs of nodes included in a previous layer may be input. The weighted inputs may be obtained by multiplying inputs of nodes included in the previous layer by a respective weight. The weights may also be referred to as parameters of the neural network 100. The activation function may include, for example, sigmoid, hyperbolic tangent (tanh), or rectified linear unit (ReLU). By the activation function, nonlinearity of the neural network 100 may be formed. For example, nodes included in the output layer 130, may receive weighted inputs of activation outputs of nodes included in a previous layer.

In an example, when input data is given, the neural network 100 may calculate values or probabilities for each of based on a number of classes to be identified in the output layer 130 through the hidden layer 120, and may identify the input data based on the class having a highest probability among the outputs. The neural network 100 may identify the input data in other ways without deviating from the sprit or scope of the illustrative examples described. The neural network 100 may also verify the input data with respect to reference data. For example, when the neural network 100 is a reinforcement learning model, input data associated with a current state may be received, and output data indicating an action associated to be optimal in the current state may be output.

When the neural network 100 has sufficiently large width and depth, the neural network 100 may have a capacity that is enough to implement a trained arbitrary function. When the neural network 100 is trained with a sufficiently great amount of training data through a suitable training process, optimal recognition performance is achieved, as a non-limiting example.

When input data includes task-irrelevant content that is irrelevant to noise or a task, inference performance of the neural network 100 may be reduced. For example, if an input image includes a randomly selected television (TV) screen image, then performance of a reinforcement learning model trained by a curiosity-based exploration scheme may be reduced. To remove the task-irrelevant content from the input data, in example, an information bottleneck (IB) scheme may be used. For example, an input variable X, a representation Z of the neural network 100, and a target variable Y may be given, a prediction term $I(Z;Y)$ representing performance of a current task may be maximized, and a compression term $I(Z;X)$ may be limited, thereby obtaining a compressed representation Z. In an example, the computing apparatus may obtain the compressed representation Z so that the input variable X may include a relatively large amount of information relevant to the target variable Y rather than information irrelevant to the target variable Y.

The neural network 100 may be trained through a tractable objective function, without a need to optimize an upper limit of a compression term. Since a prior probability distribution does not need to be assigned for each task for the compressed representation Z in the example training of the neural network 100, the neural network 100 may exhibit consistent and stable performance for various tasks. Also, the neural network 100 may be trained through a stochastic drop operation, and a drop layer of the neural network 100 may be replaced with a deterministic drop operation in an inference operation. Furthermore, the neural network 100 may be more quickly trained because there may be no upper limit of the compression term. The neural network 100 may be used for various structures employing the information bottleneck (IB) scheme as well as reinforcement learning and may have prediction performance that is robust against noise.

Figure 2:
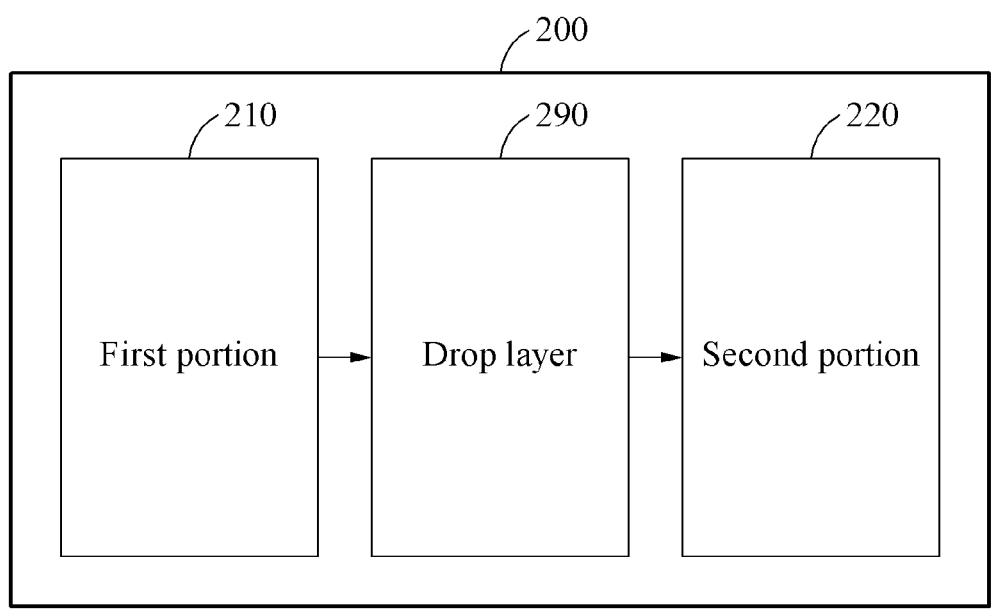
FIG. 2 illustrates an example of a drop layer.

FIG. 2 illustrates an example of a drop layer.

Referring to FIG. 2, a neural network 200 may include a first portion 210, a drop layer 290, and a second portion 220. The first portion 210 may be a portion that propagates input data to the drop layer 290, and the second portion 220 may be a portion that receives data output by the drop layer 290.

A computing apparatus may extract feature data from input data using the first portion 210 of the neural network 200. The first portion 210 may include, for example, a convolution layer. The convolution layer may be a layer in which a convolution operation based on a kernel filter is applied to data. However, a layer configuration of the first portion 210 is not limited thereto, and the first portion 210 may also include various combinations of various layers, for example, a pooling layer, a dense layer, or a fully connected layer.

The computing apparatus may generate compressed representation data of the extracted feature data by dropping an individual feature value of the extracted feature data at the drop layer 290 based on a drop probability corresponding to the feature value. The drop layer 290 may include a stochastic drop operation or a deterministic drop operation. The computing apparatus may apply a feature-wise and/or element-wise drop probability in the drop layer 290, and may discretely drop feature values of feature data input to the drop layer 290, to compress the feature data. An example of a drop operation by the drop layer 290 will be further described below with reference to FIG. 3. In an example, a drop operation on an element may represent replacing a value of the corresponding element with "0".

The computing apparatus may indicate an inference result from the compressed representation data using the second portion 220 of the neural network 200. The second portion 220 may be a portion including layers from the drop layer 290 to an output layer. The inference result may include, for example, a recognition result, and an action determined to be optimized for a current state given in input data.

Figure 3:
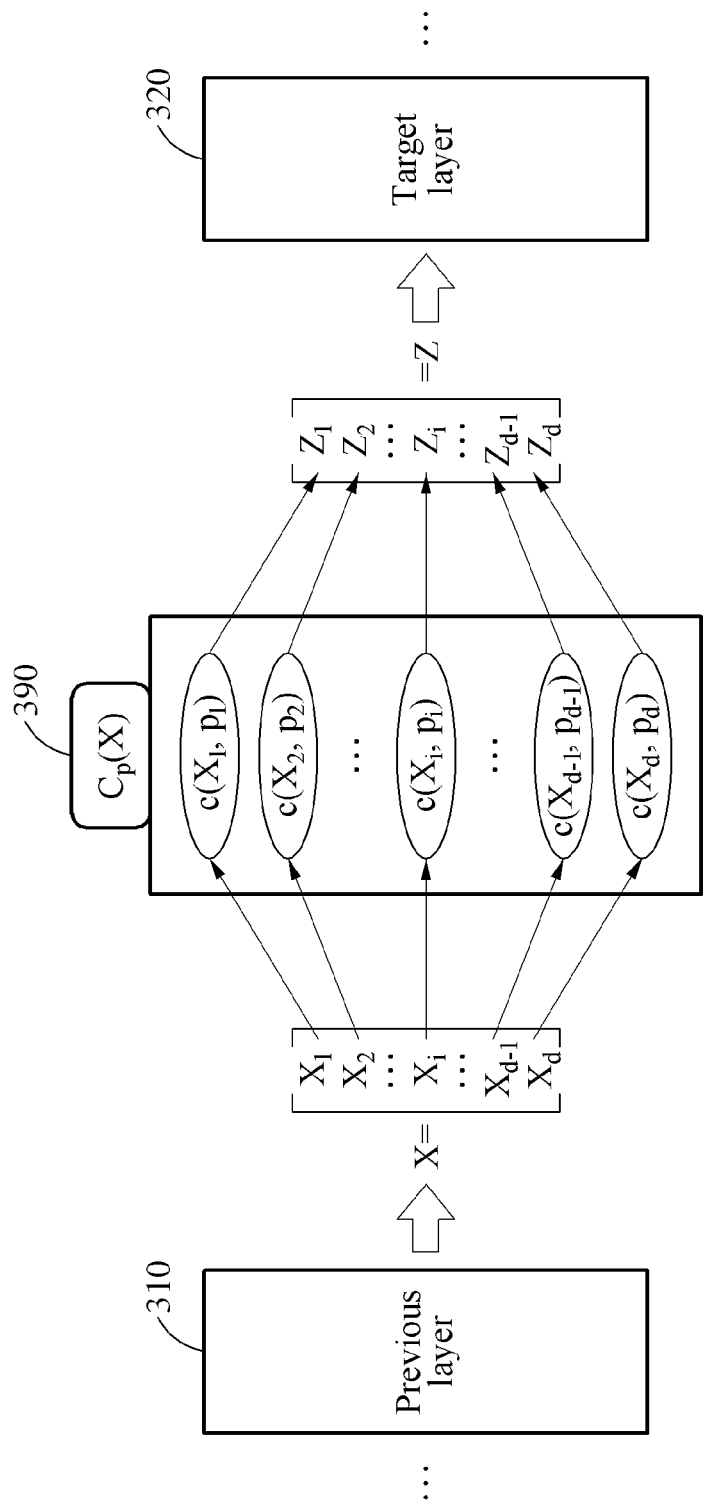
FIG. 3 illustrates an example of a drop operation using a drop layer.

FIG. 3 illustrates an example of a drop operation using a drop layer.

A computing apparatus may determine whether to drop a corresponding feature value at a drop layer 390 based on a plurality of drop probabilities that are assigned based on a relevance to a target task.

The plurality of drop probabilities may be used to determine whether to drop a feature value, and each of the drop probabilities may be individually set based on a relevance between the target task and an element to which a corresponding drop probability is to be applied in data that is input to the drop layer 390. The drop probabilities of the drop layer 390 may be determined by training that will be further described below with reference to FIG. 5. The drop layer 390 may include a plurality of drop probabilities assigned independently for each of elements (for example, feature values). In an example, the drop layer 390 may include a number of drop probabilities corresponding to a number of dimensions of feature data received from a previous layer 310. For example, when an input dimension of the drop layer 390 is configured with "d" dimensions, the drop layer 390 may include "d" drop probabilities. In this example, "d" may be an integer greater than or equal to "1". When feature data including "d" elements is input to the drop layer 390, an element of the feature data may be represented as a feature value. If feature values of feature data are given as shown in Equation 1 below, a drop probability to be applied to each of the feature values may be represented as shown in Equation 2 below.

$$X=[X_1, \ldots ,X_d]\in \mathbb{R}^d \qquad \text{[Equation 1]}$$

$$p=[p_1, \ldots ,p_d]\in[0,1]^d \qquad \text{[Equation 2]}$$

In Equation 1, $X_i$ denotes a i-th feature value among "d" feature values of feature data. The feature data may also be implemented in a form of a vector and may be referred to as a "feature vector". Also, i denotes an integer between "1" and "d", inclusive, and may be an index indicating an element position in a vector. $p_i$ denotes an i-th drop probability among "d" drop probabilities of the drop layer 390. $p_i$ may be applied to an i-th element. In an example, each drop probability may be set independently of another drop probability in the drop layer 390. For example, a first drop probability applied to a first element (for example, a first feature value) of the feature data may be different from a second drop probability applied to a second element (for example, a second feature value), based on a relevance to a target task. For example, when the first feature value is not relevant to a target task for input data and when the second feature value is relevant to the target task, the first drop probability may be determined to be greater than the second drop probability. The target task may be, for example, a task of recognizing an object included in input data as recognition of the input data, however, examples are not limited thereto, and may comprise various other tasks.

The computing apparatus may individually determine whether to drop each feature values using the drop layer 390 that includes a plurality of drop probabilities that are determined independently for each element. For example, the computing apparatus may determine whether to drop an individual feature value of feature data based on drop probabilities included in the drop layer 390, as shown in Equation 3 below. The computing apparatus may generate compressed representation data Z by individually dropping feature values of feature data X transmitted from the previous layer 310 to the drop layer 390.

$$\overline{Z}=\overline{C}_p(X)=[\overline{c}(X_1,p_1), \ldots ,\overline{c}(X_d,p_d)] \qquad \text{[Equation 3]}$$

In Equation 3, $C_p(X)$ denotes an operation of the drop layer 390 on the feature data X. The computing apparatus may drop a feature value of a corresponding index from the feature data X based on a drop probability assigned to each index of the drop layer 390. The computing apparatus may drop a first feature value of extracted feature data based on a first drop probability of the drop layer 390. The computing apparatus may drop a second feature value of extracted feature data based on a second drop probability of the drop layer 390.

In an example, for each feature value of feature data, the computing apparatus may determine whether to drop a corresponding feature value by performing a trial based on a binomial distribution function with a drop probability corresponding to the feature value. For example, the computing apparatus may drop a feature value of each index based on Equation 4 shown below.

$$c(X_i, p_i) = b \cdot \text{Bernoulli}(1 - p_i) \cdot X_i, \text{ where } b = \frac{d}{d - \sum_k p_k} \quad \text{[Equation 4]}$$

In Equation 4, Bernoulli denotes a Bernoulli distribution function as a binomial distribution function. b denotes a scale factor for consistently regularizing a scale of the compressed representation data Z. In Equation 4, a single scale factor is used so that a relative scale between feature values may be preserved. The computing apparatus may drop a feature value of a corresponding index based on a Bernoulli trial according to a probability of $(1-p_i)$ for each index in Equation 4. If it is determined that a feature value is to be dropped, the computing apparatus may replace the feature value by "0". If it is determined that a feature value is not to be dropped, the computing apparatus may preserve the feature value. The computing apparatus may multiply the scale factor b by the preserved feature value.

In Equation 4, a binomial distribution function may be a Bernoulli distribution function approximated using a sigmoid function that is differentiable. The approximated Bernoulli distribution function will be described below with reference to FIG. 5.

The drop layer 390 to which a stochastic drop operation is applied has been described above, however, examples are not limited thereto. When drop probabilities of the drop layer 390 are determined in training that will be described below with reference to FIG. 5, the drop layer 390 may also be implemented by a deterministic drop operation. In the deterministic drop operation, Equation 5, instead of Equation 3, may be applied, and Equation 6, instead of Equation 4 may be applied.

$$\overline{Z} = \overline{C}_p(X) = [\overline{c}(X_1, p_1), \ldots, \overline{c}(X_d, p_d)] \quad \text{[Equation 5]}$$

$$\overline{c}(X_i, p_i) = \overline{b} \cdot \mathbb{1}(p_i < 0.5) \cdot X_i, \text{ where } \overline{b} = \frac{d}{\sum_k \mathbb{1}(p_k < 0.5)} \quad \text{[Equation 6]}$$

In Equation 6, $\overline{Z}$ denotes compressed representation data obtained by dropping feature values based on the deterministic drop operation. In Equation 6, $\mathbb{1}(p_i<0.5)$ denotes a function having a value of "1" if $p_i$ is less than "0.5" and having a value of "0" if $p_i$ is greater than or equal to "0.5". In an example, if a drop probability assigned to each of a plurality of feature values of feature data is greater than or equal to a threshold (for example, "0.5" in Equation 6) or meets the threshold, the computing apparatus may drop a corresponding feature value at the drop layer 390, instead of performing a Bernoulli trial. In another example, if a drop probability assigned to each of the feature values is less than the threshold or fails to meet the threshold, the computing apparatus may preserve a corresponding feature value in the drop layer 390. By the above deterministic drop operation, the computing apparatus may perform a neural network operation of inferring a stable and consistent result without randomness.

Even in the deterministic drop operation, the computing apparatus may calculate a scale factor $\overline{b}$ to maintain a scale of the compressed representation data $\overline{Z}$. The computing apparatus may adjust, using the scale factor $\overline{b}$ based on a number of feature values dropped from the feature data by the drop layer 390, the remaining preserved feature values. For example, the scale factor $\overline{b}$ may be a ratio between a number of dropped feature values and a number of all dimensions.

The stochastic drop operation may be applied to both training and inference, but the deterministic drop operation may be applied only to inference, not training. Thus, an effect of regularizing a bias of data used in training may occur by stochastically dropping feature values during the training.

The computing apparatus may transmit the compressed representation data Z and $\overline{Z}$ that are generated based on a stochastic scheme (for example, Equations 3 and 4 above) or a deterministic scheme (for example, Equations 5 and 6 above) to the target layer 320. The previous layer 310 may be connected to the drop layer 390 in front of the drop layer 390 and may belong to a first portion of the neural network. The target layer 320 may be connected to the drop layer 390 behind the drop layer 390 and may belong to a second portion of the neural network.

Figure 4:
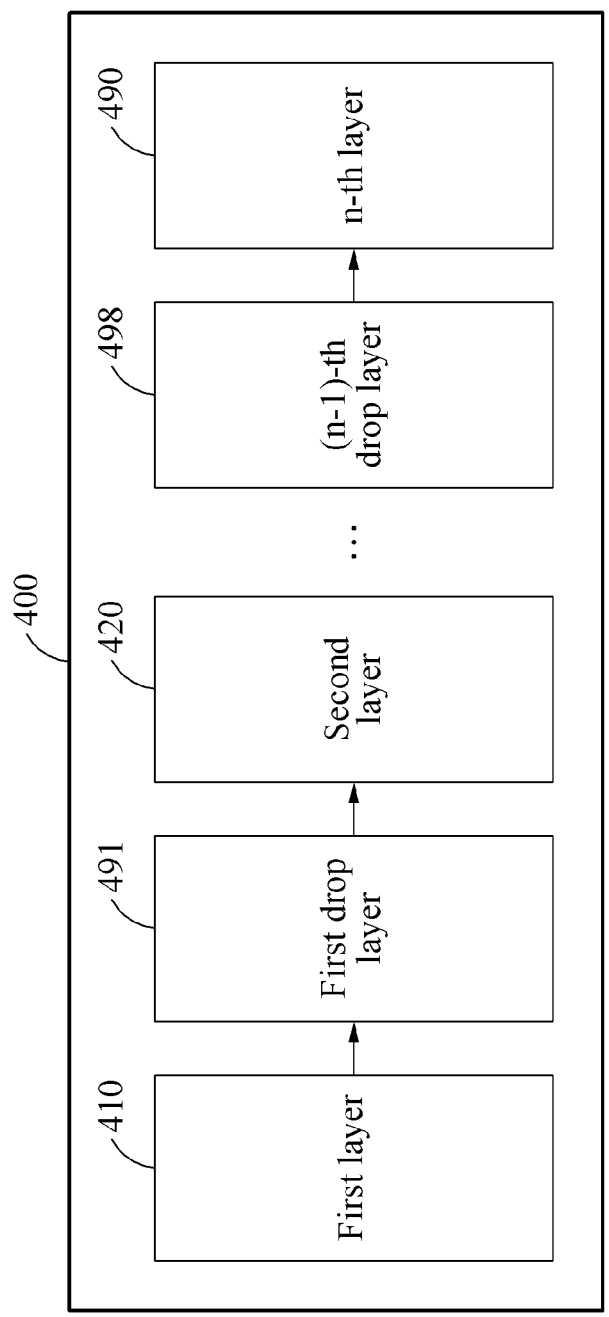
FIG. 4 illustrates an example of a model in which drop layers are applied.

FIG. 4 illustrates an example of a model to which a plurality of drop layers are applied.

Although a single drop layer has been described above, examples are not limited thereto. For example, a neural network 400 may include a plurality of drop layers. FIG. 4 illustrates an example of a structure in which a first drop layer 491 is connected between a first layer 410 and a second layer 420 and an (n−1)-th drop layer 498 is connected in front of an n-th layer 490. In this example, n may be an integer greater than or equal to "2". A structure in which layers are connected in series in the neural network 400 is shown in FIG. 4, however, examples are not limited thereto. For example, at least a portion of the layers may be connected in parallel, and an arrangement of drop layers may also vary depending on a design.

Figure 5:
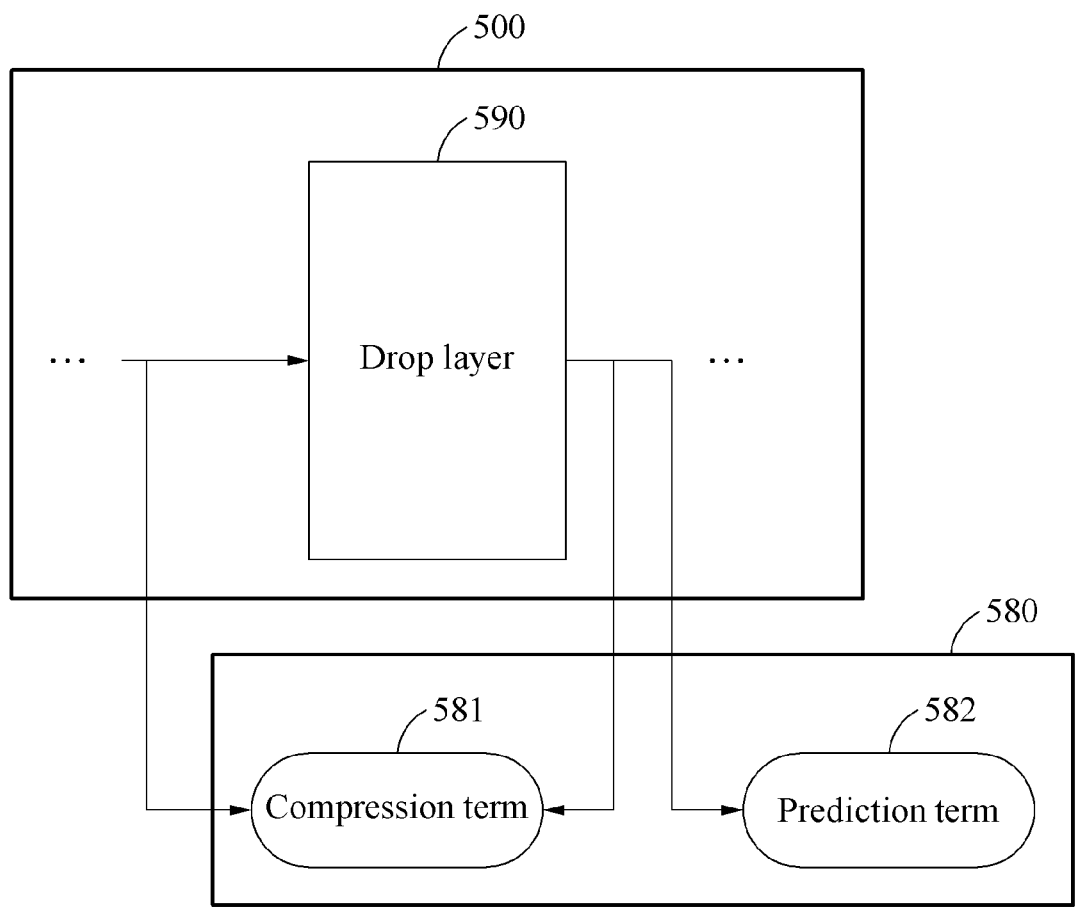
FIGS. 5 and 6 illustrate examples of training a drop layer.
Figure 6:
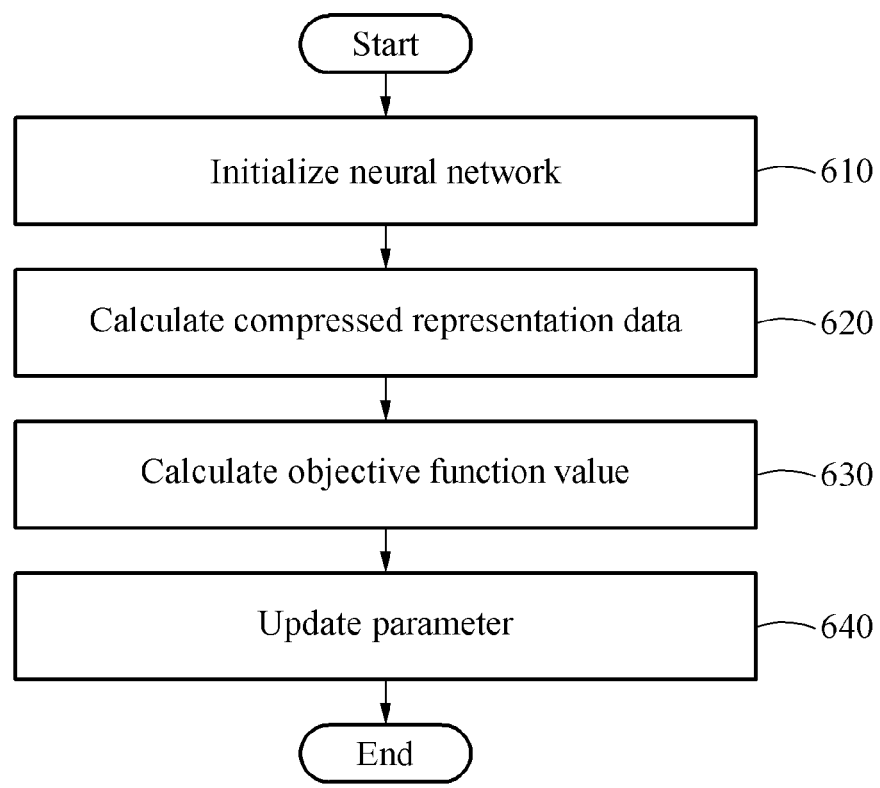

FIGS. 5 and 6 illustrate examples of training a drop layer. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

In an example, a training apparatus may train a drop layer using a prediction term and a compression term. The training apparatus may train the drop layer independently, however, examples are not limited thereto. The training apparatus may also train the drop layer together with the remaining portions of a neural network 500.

Referring to FIG. 6, in operation 610, the training apparatus may initialize the neural network 500. In an example, the training apparatus may initialize drop probabilities of a drop layer 590 and a parameter of the neural network 500.

In operation 620, the training apparatus may calculate compressed representation data. For example, the training apparatus may calculate temporary compressed representation data and a temporary output while propagating a training input to a temporary neural network 500. The temporary neural network 500 may be the neural network 500 that is being trained, and the temporary compressed representation data and the temporary output may be data calculated in the neural network 500 during training. For example, the training apparatus may generate temporary compressed representation data by dropping an individual feature value of feature data extracted from the training input, based on a drop probability corresponding to the feature value using the drop layer 590 of the neural network 500.

In operation 630, the training apparatus may calculate an objective function value. For example, the training apparatus may calculate an objective function value 580 using an objective function according to Equations 7 and 8 that will be described below. The training apparatus may calculate an objective function value 580 using a prediction term 582 that is based on temporary compressed representation data and a target task, and using a compression term 581 that is based on feature data and the temporary compressed representation data. The objective function may be represented as shown in Equation 7 below.

$$\text{minimize } -I(Z;Y)+\beta I(Z;X) \quad \text{[Equation 7]}$$

In Equation 7, I(Z;Y) denotes a term, for example, the prediction term 582, for preserving task-related information, and I(Z;X) denotes a term, for example, the compression term 581, for compressing an input variable X. β denotes a Lagrange multiplier and a coefficient for adjusting a compression rate of representation data Z. The compression term 581 I(Z;X) may be defined as shown in Equation 8 below.

$$I(Z;X) = \sum_{i=1}^{d} I(Z_i; X_i) = \sum_{i=1}^{d}(H(X_i) - H(X_i \mid Z_i)) \quad \text{[Equation 8]}$$
$$= \sum_{i=1}^{d}\binom{H(X_i) - p_i \cdot H(X_i \mid Z_i = 0) -}{(1-p_i) \cdot H(X_i \mid Z_i = bX_i)}$$
$$\approx \sum_{i=1}^{d}(H(X_i) - p_i \cdot H(X_i) - (1-p_i) \cdot 0)$$
$$= \sum_{i=1}^{d} H(X_i)(1 - p_i),$$

In Equation 8, $X_1$ through $X_d$ may be assumed to be independent of each other. Since $Z_i=0$ indicates that there is no information about $X_i$, $H(X_i|Z_i=0)=H(X_i)$. Also, since $Z_i=bX_i$ indicates that $Z_i$ preserves a feature of $X_i$, a conditional entropy may become zero, that is, $H(X_i|Z_i=bX_i)=0$. For reference, H( ) denotes an entropy function, and an example of the entropy function will be described below. As defined in Equation 8, the compression term 581 may be a product of entropy and $(1-p_i)$ for each index, and may be calculated by a simple trackable equation. If a Bernoulli probability distribution is not differentiable, training may be difficult because it may not be possible to differentiate the compressed representation data Z. Thus, as the binomial distribution function, a Bernoulli distribution function approximated using a sigmoid function that is differentiable with respect to a drop probability may be used, as shown in Equation 9 below.

$$\text{Bernoulli }(p) \approx \quad \text{[Equation 9]}$$
$$\text{sigmoid}\left(\frac{1}{\lambda}(\log p - \log(1-p) + \log u - \log(1-u))\right)$$

In Equation 9, u denotes a random value sampled in a uniform distribution (for example, uniform(0;1)), and λ denotes a temperature for a concrete distribution. Also, p denotes a drop probability and may be assigned to allow a feature variable with a relatively low relevance to a target task to have a relatively high value, as described above.

In operation 640, the training apparatus may update a parameter of the neural network. The training apparatus may update a parameter of the drop layer 590 based on the calculated objective function value 580. For example, the training apparatus may update all parameters of the neural network 500 and parameters of the drop layer 590 using a gradient descent scheme to minimize a sum of the prediction term 582 and the compression term 581. The parameter of the drop layer 590 may include a drop probability, and the parameter of the neural network 500 may include, for example, a connection weight. The training apparatus may repeat the above-described training operation until a parameter value converges.

In an example, the training apparatus may train the neural network 500 on-line on a consecutive data streams containing noise. The training apparatus may obtain compressed representation data from currently input data in a data stream using the neural network 500. The training apparatus may additionally calculate a regularization term to prevent a catastrophic forgetting phenomenon of a parameter in a situation in which it may not be possible to verify previous data, in addition to the objective function according to Equations 7 and 8. The regularization term may be a term indicating a distance to an existing parameter and may be calculated using a method such as, for example, elastic weight consolidation, variational continual learning, and meta-learning for online learning. The training apparatus may update all the parameters of the neural network 500 and parameters of the drop layer 590 using a gradient descent scheme to minimize a sum of the prediction term 582, the compression term 581, and the regularization term.

In an example, in reinforcement learning, the training apparatus may use a reinforcement learning agent, and examples of the reinforcement learning will be described below with reference to FIGS. 7 and 8.

Figure 7:
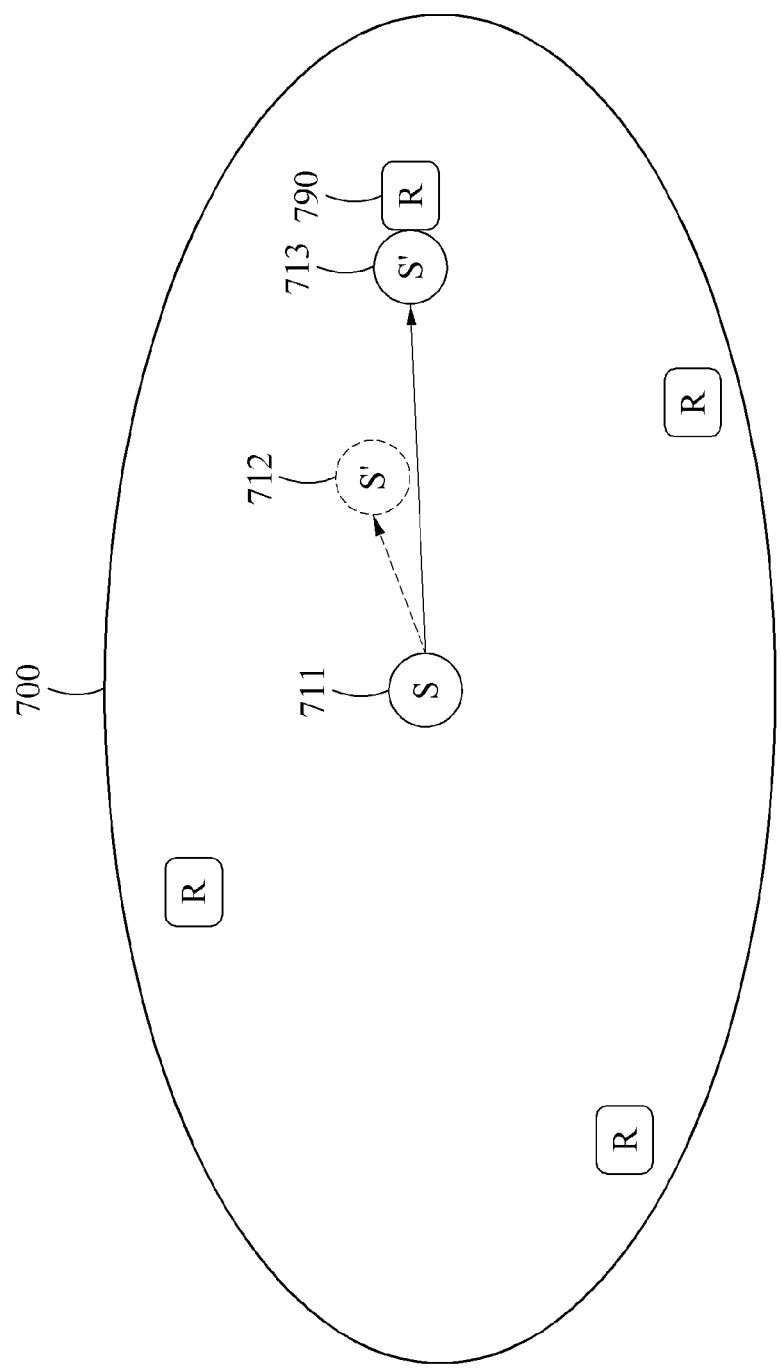
FIGS. 7 and 8 illustrate examples of training for reinforcement learning of a drop layer.
Figure 8:
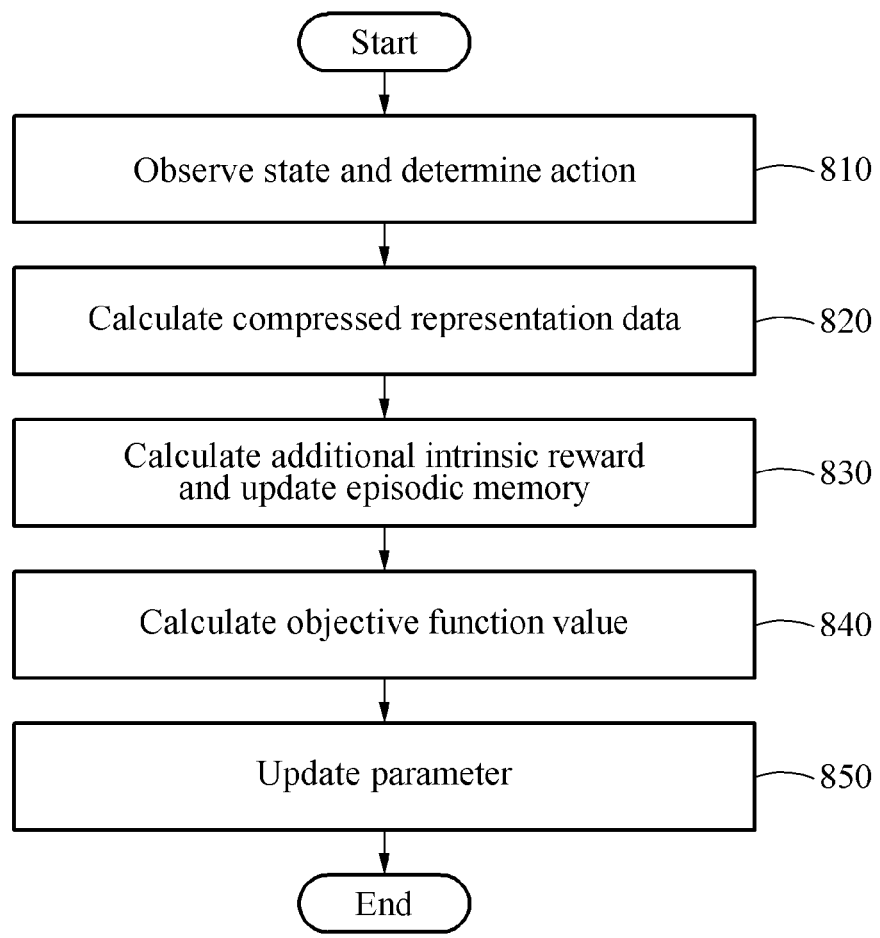

FIGS. 7 and 8 illustrate examples of training for reinforcement learning of a drop layer. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

In an example, a neural network for reinforcement learning may include a policy network and a discriminator network. The policy network may be a network that determines an optimized action in a current state according to a trained decision-making strategy, and may include a drop layer and a feature extractor that maps a state to an embedding space. The policy network may be included as a portion of the entire neural network.

In an example, a training apparatus may train the policy network using reinforcement learning so that a balance is obtained between exploration of uncharted territory and utilization of current knowledge. A training apparatus may train the policy network so that a reinforcement learning agent may robustly explore a state space 700 in which an intrinsic reward 790 is sparsely given, even in a noisy observation. FIG. 7 illustrates the state space 700 in which the intrinsic reward 790 is sparsely given. For example, the training apparatus may train the drop layer together with the policy network during reinforcement learning that is performed online, for example, in real time. In this example, an additional intrinsic reward for exploration of the state space 700 may be further defined, in addition to the intrinsic reward 790 for a policy. In an example, when a next state 712 is adjoining a current state S 711, it may be difficult for the reinforcement learning agent to reach the intrinsic reward 790 in the state space 700. In another example, when a next state 713 is marginal with respect to the current state S 711, the reinforcement learning agent may have a relatively high probability of reaching the intrinsic reward 790. The training apparatus may allow the reinforcement learning agent to search for a marginal state by additional intrinsic reward. The training apparatus may calculate a higher additional intrinsic reward score for a state that is not explored previously. For reference, the reinforcement learning agent may be an agent defined to explore the state space 700 within an environment in the reinforcement learning. Online training and/or online reinforcement learning may indicate updating parameters of the neural network in real time while operating the neural network.

Referring to FIG. 8, in operation 810, the training apparatus may observe a current state of the reinforcement learning agent and may determine an action based on a current policy network, during online training. The training apparatus may observe a next state based on the determined action.

In operation 820, the training apparatus may calculate compressed representation data. For example, the training apparatus may calculate compressed representation data of the current state S 711 and a next state S' as shown in Equation 10 below. For example, the training apparatus may calculate compressed representation data Y of the current state S 711 by applying a drop layer $C_p$ to feature data $f_\phi(S)$ extracted from the current state S 711. Also, the training apparatus may calculate compressed representation data Z of the next state S' by applying the drop layer $C_p$ to feature data $f_\phi(S')$ extracted from the next state S'.

$$X=f_\phi(S'), Z=C_p(X), Y=C_p(f_\phi(S))$$ [Equation 10]

In Equation 10, $f_\phi$ denotes a feature extractor including a feature extraction operation of mapping a state to feature data, S denotes a random variable indicating a current state, A denotes a random variable indicating an action, and S' denotes a random variable indicating a next state.

In operation 830, the training apparatus may calculate an additional intrinsic reward and may update an episodic memory. For example, the training apparatus may configure an episodic memory M for observations previous to a current time step, and may calculate an additional intrinsic reward for the current time step based on the episodic memory M. The additional intrinsic reward may be an intrinsic reward for exploration of a state space, in addition to the intrinsic reward 790 for a target task. The additional intrinsic reward may be, for example, a degree of novelty of a newly observed state. The additional intrinsic reward will be described below with reference to Equation 12.

The training apparatus for the reinforcement learning may store an episode, which is a process from a start to an end of exploration. A memory space in which an episode is stored may be referred to as an "episodic memory M". The training apparatus may add a feature of a state observed in each step to an empty episodic memory M, as shown in Equation 11 below.

$$M=\{\overline{C}_p(f_\phi(s_1)), \overline{C}_p(f_\phi(s_2)), \overline{C}_p(f_\phi(s_{t-1}))\}$$ [Equation 11]

In Equation 11, t denotes a time step and may be an integer greater than or equal to "2", and $s_1$ to $s_{t-1}$ denote states observed in a first time step to a (t−1)-th time step, respectively, from an episode. An episodic memory may store compressed representation data of feature data extracted for states observed at every time step. In Equation 11, the training apparatus may store compressed representation data, to which a deterministic drop operation is applied, in the episodic memory M. However, examples are not limited thereto, and a stochastic drop operation may also be applied.

The training apparatus may calculate an additional intrinsic reward for a new state $s_t$ based on a deep infomax discriminator $T_\psi$ and the above-described episodic memory M. The deep infomax discriminator $T_\psi$ may be trained to output a relatively high value if two inputs are jointed or similar and to output a relatively low value if the two inputs are less relevant because the two inputs are marginal or random. The training apparatus may determine an additional intrinsic reward for exploration as shown in Equation 12 below.

$$r_{M,t}^j(s_t) = \frac{1}{t-1}\sum_{j=1}^{t-1}[g(s_t, s_j) + g(s_j, s_t)],$$ [Equation 12]

$$\text{s.t. } g(x, y) = sp(-T_\psi(\overline{C}_p(f_\phi(x)), \overline{C}_p(f_\phi(y))))$$

In Equation 12, $g(s_t, s_j)$ denotes unlikeliness of $s_t$ being a next state of $s_j$, and $g(s_j, s_t)$ denotes unlikeliness of $s_t$ being a previous state of $s_j$. The unlikeliness may be a degree by which a possibility is unlikely, that is, $g(s_t, s_j)$ and $g(s_j, s_t)$ may represent possibilities of $s_t$ not being the next state and the previous state of $s_j$. If Equation 12 is intuitively interpreted, $r_{M,t}^i(s_t)$ may be low for $s_t$ close to an area of previous observations (for example, observations in the first time step to the (t−1)-th time step) within the state space 700. For $s_t$ far from the area of the previous observations within the state space 700, $r_{M,t}^i(s_t)$ may be high. As a result, through the additional intrinsic reward based on Equation 12 above, the training apparatus may perform training by calculating a reward to explore a more distant area in the state space 700, during reinforcement learning of the neural network.

Thus, the training apparatus may provide a method of stably exploring the state space 700 in which the intrinsic reward 790 is sparsely disposed and that has noise, by introducing the above-described additional intrinsic reward. As described above with reference to Equation 12, the additional intrinsic reward may be calculated from a compressed representation through a deterministic drop operation. The training apparatus may provide a stable exploration signal for a policy optimization through the deterministic drop operation.

The training apparatus may calculate the additional intrinsic reward based on Equation 12, and may update compressed representation data of a current state (for example, a state $s_t$ of a current time step t) to the episodic memory M.

In operation 840, the training apparatus may calculate an objective function value. For example, the training apparatus may apply an objective function, such as, for example, Deep Infomax-based objective function to the feature extractor $f_\phi$ for state embedding and each state transition S, A, and S', during reinforcement learning. The training apparatus may update a parameter $\phi$ of the feature extractor $f_\phi$, a drop probability of a drop layer, and a parameter $\psi$ of a discriminator network $T_\psi$, together, which will be described below.

In association with training of the drop layer, for the random variables described above with reference to Equation 10, a compression term for each state transition may be represented as shown in Equation 13 below.

$$I(Z;X) = I(C_p(f_\phi(S')); f_\phi(S'))  \quad \text{[Equation 13]}$$

Equation 13 may be a term designed to allow a drop layer $C_p$ to drop a feature that is not needed from feature data $X = f_\phi(S')$. The feature data X may be data representing a next state as an embedding space. A prediction term may be represented as shown in Equation 14 below.

$$I(Z;Y) = I(C_p(f_\phi(S')); C_p(f_\phi(S')))  \quad \text{[Equation 14]}$$

Equation 14 may be an informative term designed so that a compressed representation of feature data Y of a current state and a compressed representation of feature data X of a next state inform each other. The prediction term represented as Equation 14 may include, for example, a term represented as shown in Equation 15 below. Equation 15 may represent a Jensen-Shannon mutual information estimator $\hat{I}_\psi^{JSD}(Z;Y)$ as shown below.

$$\hat{I}_\psi^{JSD}(Z;Y) = \tfrac{1}{2}(\mathbb{E}_{P_{ZY}}[-sp(-T_\psi(Z,Y))] - \mathbb{E}_{P_Z \otimes P_Y}[sp(T_\psi(Z,\tilde{Y}))] + \log 4  \quad \text{[Equation 15]}$$

In Equation 15, $T_\psi$ denotes a discriminator network with a parameter $\psi$, and sp( ) denotes a softplus function. If a Gaussian assumption is used due to continuous feature data $X_i$ input to a drop layer, Equation 16 shown below may be used as an entropy function.

$$H(X_i) = \tfrac{1}{2}(1 + \log(2\sigma_i^2 \pi))  \quad \text{[Equation 16]}$$

In Equation 16, $\sigma_i$ denotes a variance of feature data $X_i$. An objective function value for the drop layer may be summarized as shown in Equation 17 below.

$$\underset{p,\psi}{\text{minimize}} - \hat{I}_\psi^{JSD}(Z;Y) + \beta \sum_{i=1}^{d} H(X_i)(1-p_i)  \quad \text{[Equation 17]}$$

To set a drop probability p to be more freely trained, $p_i = \text{sigmoid}(p'_i)$ may be used. $p'_i$ may be initialized by a uniform distribution Uniform(a, b). a, and b may be real numbers. The drop probability p may be trained independent of or together with a parameter of the neural network. If Equation 10 is applied to Equation 17, Equation 18 may be derived as shown below.

$$\underset{p,\psi,\phi}{\text{minimize}} - \hat{I}_\psi^{JSD}(C_p(f_\phi(S')); C_p(f_\phi(S))) +  \quad \text{[Equation 18]}$$

$$\beta \sum_{i=1}^{d} H(f_\phi(S'))(1-p_i)$$

In Equation 18, each $H(f_\phi(S'))$ may be calculated by a Gaussian assumption. While $f_\phi$, p, and $T_\psi$ are being trained online, $f_\phi$, p, and $T_\psi$ may be used for exploration by a reinforcement learning agent together with the episodic memory M.

In operation 850, the training apparatus may update a parameter. The training apparatus may update a parameter (for example, a parameter of a policy network and drop probabilities of a drop layer) of the neural network based on the objective function value calculated in operation 840. The training apparatus may train the policy network together with drop probabilities of the drop layer by applying a policy gradient descent scheme, such as a proximal policy optimization (PPO), to the additional intrinsic reward according to Equation 12 above.

Figure 9:
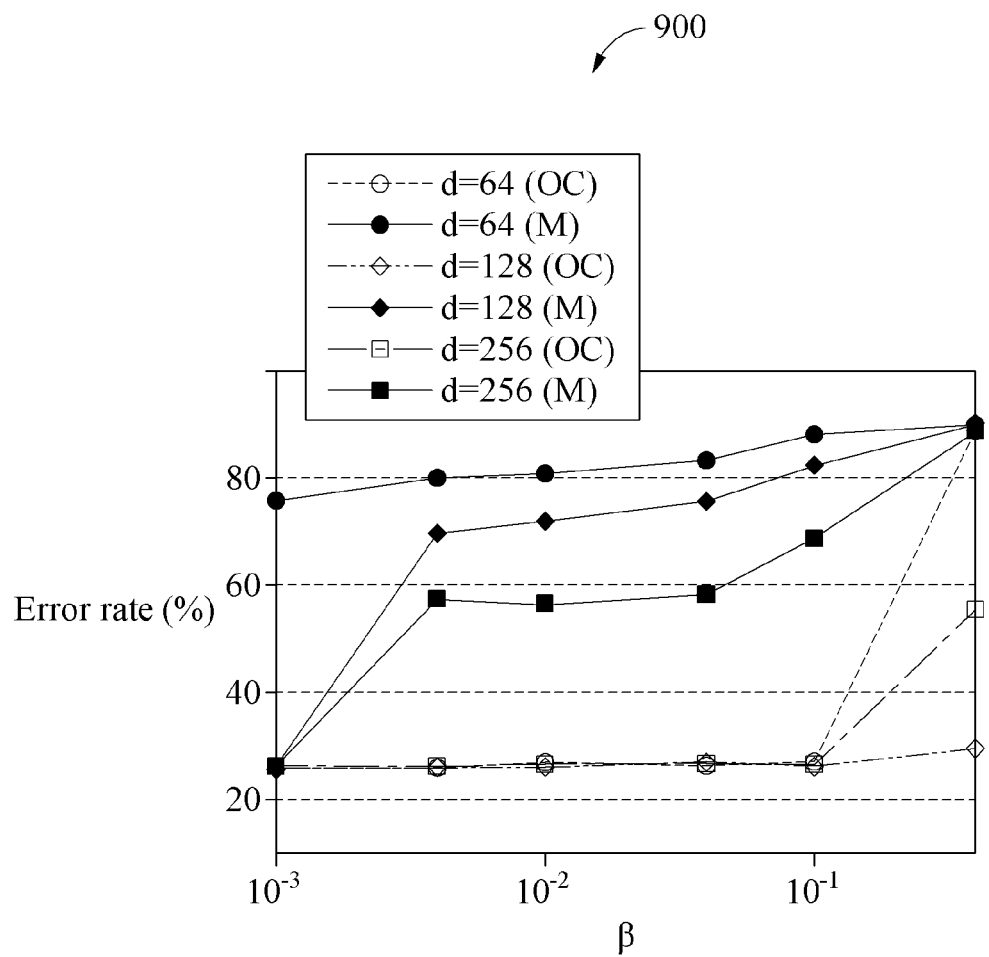

FIGS. 9 and 10 illustrate examples of performance of a neural network including a drop layer.

FIG. 9 illustrates an experimental result of a control effect of task-irrelevant information. A graph 900 of FIG. 9 shows that task-irrelevant information is controlled based on a value of a Lagrange multiplier $\beta$ of a compression term in an occluded Canadian Institute for Advanced Research (CIFAR) dataset. In FIG. 9, d represents a dimension of output data, for example, feature data, of a feature extractor, M represents a modified national institute of standards and technology (MNIST) dataset, and OC represents an occluded CIFAR dataset. If the Lagrange multiplier $\beta$ has an extremely low value, for example, $10^{-3}$, the MNIST dataset exhibits relatively high performance even though training is performed in the occluded CIFAR dataset. In other words, it is found that control of information is insufficient. If an appropriate value of the Lagrange multiplier $\beta$, for example, $10^{-1}$, is given, the performance of the MNIST dataset may be controlled while preserving performance in the occluded CIFAR dataset. In other words, performance for tasks other than a target task may be controlled, and performance of the target task may be preserved.

A table 1000 of FIG. 10 shows an average reward of a neural network according to an example, and an average reward of other methods (for example, an intrinsic curiosity module (ICM), emergent configurations (EC), or ECO) in a task of DM Lab and a task of VizDoom. In FIG. 10, ECO may refer to an online version of the EC, and PPO may refer to proximal policy optimization. FIG. 10 illustrates an average reward in an example in which a drop layer together with a policy network are trained online. A network with an applied drop layer is illustrated as "PPO+Drop-bottleneck" in FIG. 10. In FIG. 10, in an environment of noise N, a new noise pattern of noise may be generated for each observation. A noise action (NA) may represent an environment in which a noise pattern is generated only when a reinforcement learning agent performs a predetermined action. An example of an image action (IA) may be a situation in which a channel of a television (TV) changes when a reinforcement learning agent performs a predetermined action. As shown in FIG. 10, a neural network including a drop layer may exhibit highest performance 1010 in an environment in which a reward is very sparsely given.

Figure 11:
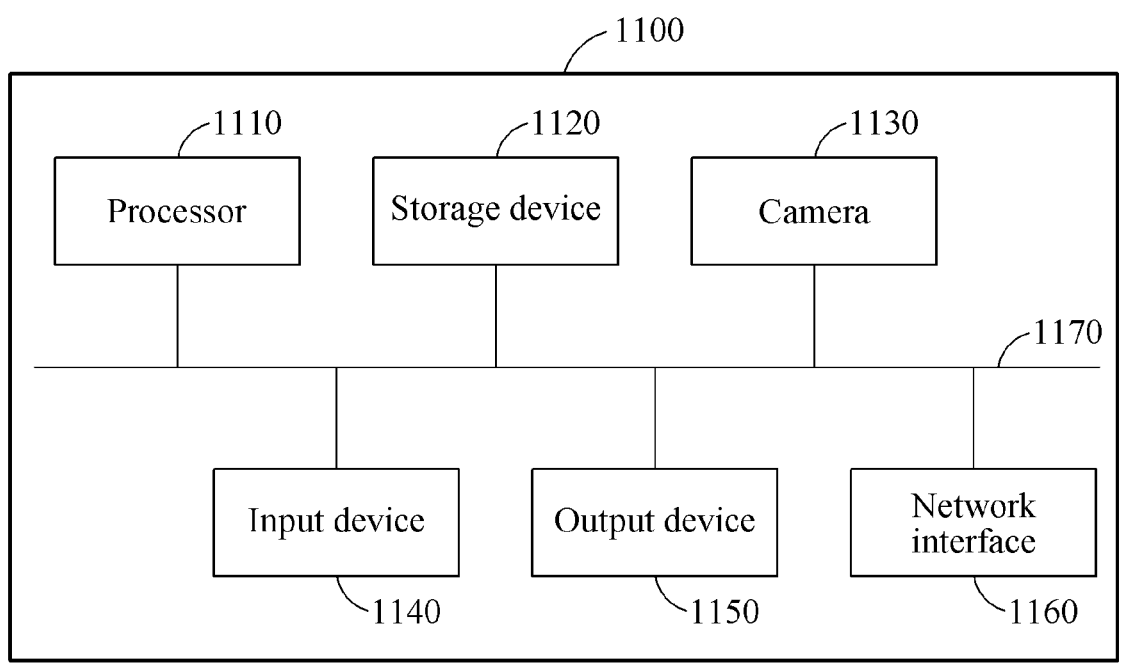
FIG. 11 illustrates an example of a computing apparatus.

FIG. 11 illustrates an example of a computing apparatus 1100.

Referring to FIG. 11, the computing apparatus 1100 may perform a target task (for example, an inference task) using the above-described neural network including the drop layer. The inference task may include, for example, a recognition task, and the recognition task may include, for example, detection and classification of nearby objects around a stationary or moving autonomous vehicle, ID identification, facial recognition, and fingerprint recognition of a user of a smartphone. In an example, the computing apparatus 1100 may train online the neural network based on the methods of FIGS. 5 through 8.

The computing apparatus 1100 may implemented in or as devices such as, for example, a reservoir management apparatus, an image processing apparatus, a mobile terminal, a smartphone, a foldable smartphone, a smartwatch, a wearable device, a smart eye glass, a tablet computer, a netbook, a laptop, a desktop, a personal digital assistant (PDA), a set-top box, a home appliance, a biometrics-based door lock, a security device, a device for financial transactions, a device for starting a vehicle, an autonomous vehicle, or a drone.

Referring to FIG. 11, the computing apparatus 1100 may include a processor 1110, a storage device 1120, a camera 1130, an input device 1140, an output device 1150, and a network interface 1160. The processor 1110, the storage device 1120, the camera 1130, the input device 1140, the output device 1150, and the network interface 1160 may communicate with each other via a communication bus 1170.

The processor 1110 may be a hardware-implemented image generating apparatus having a circuit that is physically structured to execute desired operations. For example, the desired operations may be implemented by execution of code or instructions. The hardware-implemented generation apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 1110 is given below.

The processor 1110 may execute functions and instructions in the computing apparatus 1100. For example, the processor 1110 may process instructions stored in the storage device 1120. The processor 1110 may perform any one or any combination of the operations described above with reference to FIGS. 1 through 10. The processor 1110 may extract feature data from input data using a first portion of the neural network. The processor 1110 may generate compressed representation data of the extracted feature data by dropping an individual feature value of the extracted feature data at the drop layer based on a drop probability corresponding to the feature value. The processor 1110 may indicate an inference result from the compressed representation data using a second portion of the neural network.

In addition, the processor 1110 may perform a recognition task using the trained neural network model, and may additionally train the neural network online when a data stream for training is received. Through such additional online training, the neural network may be personalized and/or customized for an individual user. The computing apparatus 1100 may provide a dynamic recommendation in a situation in which a user may perform an arbitrary action. For example, the computing apparatus 1100 may provide a personalized diagnosis and drug recommendation in a situation in which a current drug use status of a patient is arbitrary, for example, a situation in which the patient takes drugs irregularly.

The processor 1110 may indicate the inference result using the trained neural network. For example, the processor 1110 may indicate a result of recognizing an input image. The processor 1110 may receive an input image as input data. For example, the camera 1130 may capture an input image. The processor 1110 may extract feature data from the input image using a portion (for example, a feature extractor) of the neural network. The processor 1110 may calculate compressed representation data from the extracted feature data using the drop layer. The processor 1110 may output a result obtained by recognizing an object included in the input image from the compressed representation data using another portion of the neural network.

The processor 1110 may indicate a result of recognizing data. In an example, the processor may implicitly indicate a recognition result, for example, by an operation of internally determining a success or a failure in the recognition and transmitting the result to another module. In an example, the processor may explicitly indicate a recognition result, for example, by an operation of providing an output indicating a success or a failure in the recognition in a form of visual information, auditory information, or tactile information. In an example, when the computing apparatus 1100 is implemented as an autonomous vehicle, the processor 1110 may visually output a result of detecting a nearby object as a nearby object map through the output device 1150. The processor 1110 may control and change a speed, steering, and an acceleration of the autonomous vehicle based on the result of detecting the nearby object. In another example, when the computing apparatus 1100 is implemented as a mobile terminal, the processor 1110 may output a result of recognizing a face of a user through a display. In this example, the processor 1110 may unlock the mobile terminal when the recognition is successful, and maintain a locked state of the mobile terminal when the recognition fails. For example, when the computing apparatus 1100 is implemented as a mobile terminal and when an input object included in an input image is recognized to match an object enrolled in the mobile terminal that is locked, the processor 1110 may unlock the mobile terminal.

The storage device 1120 may be implemented as a volatile memory device or a non-volatile memory device. The volatile memory device may be implemented as dynamic random-access memory (DRAM), static random-access memory (SRAM), thyristor RAM (T-RAM), zero capacitor RAM (Z-RAM), or twin transistor RAM (TTRAM). The non-volatile memory may be implemented as electrically erasable programmable read-only memory (EEPROM), a flash memory, magnetic ram (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFGM), a holographic memory, molecular electronic memory device, or insulator resistance change memory. Further description of the memory 1120 is given below.

The storage device 1120 may store information or data used to execute the processor 1110. The storage device 1120 may include a computer-readable storage medium or a computer-readable storage device. The storage device 1120 may store instructions to be executed by the processor 1110, and information associated with software or an application while the software or application is being executed by the computing apparatus 1100. The storage device 1120 may be implemented as a memory, and may store a neural network including a drop layer. The storage device 1120 may store a neural network, and a reservoir including training data for training the neural network.

The camera 1130 may capture an image including a plurality of image frames. For example, the camera 1130 may generate an input image. Also, the camera 1130 may acquire a series of images as a data stream.

The input device 1140 may receive an input from a user through a tactile, video, audio, gesture, or touch input. The input device 1140 may include, for example, a keyboard, a mouse, a touchscreen, a microphone, or other devices that may detect an input from a user and transmit the detected input.

The output device 1150 may provide an output of the computing apparatus 1100 to a user through a visual, auditory, or tactile channel. The output device 1150 may include, for example, a display, a touchscreen, a speaker, a vibration generating device, or other devices that may provide an output to a user. The display of the output device 1150 may include display devices, such as, for example, computer monitor, smartphone, a smart television (TV), a tablet, a head-up display (HUD), a three-dimensional (3D) digital information display (DID), a 3D mobile device, and a smart automobile, display of an advanced driver-assistance systems (ADAS), and eye glass display (EGD) that are operatively connected to the computing apparatus 1100. The network interface 1160 may communicate with an external device through a wired or wireless network. Also, the network interface 1160 may receive a data stream. In an example, a neural network may be received by the network interface 1160 and implemented by applying the drop layer described with reference to FIGS. 1 through 10.

In an example, a neural network may be implemented in a form of a chip and may be mounted on a mobile terminal. The neural network may be used in a process of recognizing a face that is robust against noise. Also, the mobile terminal with the neural network may provide an emotionally intelligent chatbot that recognizes a user's emotion from an image captured through a camera and conducts a conversation.

In an environment with complex dynamics, a drop layer including a deterministic drop operation may provide stability for an inference task. In an example, an autonomous vehicle using a neural network including a drop layer may consistently discard features determined irrelevant to a current driving of the autonomous vehicle in input data using a deterministic drop scheme.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the neural network computation and training method. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, the method comprising:
   extracting feature data from input data using a first portion of a neural network;
   generating compressed representation data of the extracted feature data by dropping a feature value from the extracted feature data at a drop layer of the neural network based on a drop probability corresponding to the feature value; and
   indicating an inference result from the compressed representation data using a second portion of the neural network,
   wherein the generating of the compressed representation data comprises determining whether to drop each feature value of the feature data based on a binomial distribution function with a drop probability corresponding to each feature value.

2. The method of claim 1, wherein the drop probability is assigned based on a relevance to a target task.

3. The method of claim 1, wherein the generating of the compressed representation data comprises:
   dropping a first feature value of the extracted feature data based on a first drop probability of the drop layer; and
   dropping a second feature value of the extracted feature data based on a second drop probability of the drop layer, and
   the first drop probability being different than the second drop probability.

4. The method of claim 3, wherein the first drop probability is determined to be greater than the second drop probability, in response to the first feature value not being determined to be relevant to a target task for the input data and the second feature value being determined to be relevant to the target task.

5. The method of claim 1, wherein the binomial distribution function is a Bernoulli distribution function approximated using a sigmoid function that is differentiable for the drop probability.

6. The method of claim 1, wherein the generating of the compressed representation data comprises:
   dropping each of a plurality of feature values of the feature data at the drop layer, in response to a drop probability assigned to each of the plurality of feature values meeting a threshold; and
   preserving each of the plurality of feature values in the drop layer, in response to a drop probability assigned to each of the plurality of feature values failing to meet the threshold.

7. The method of claim 6, wherein the generating of the compressed representation data comprises adjusting preserved feature values based on a number of feature values dropped from the feature data by the drop layer.

8. The method of claim 6, wherein the generating of the compressed representation data comprises adjusting preserved feature values based on a ratio of a number of feature values dropped from the feature data and a number of dimensions of the feature data.

9. The method of claim 1, wherein a number of drop probabilities of the drop layer corresponds to a number of dimensions of the feature data.

10. The method of claim 1, wherein:
the extracting of the feature data comprises receiving an input image and extracting the feature data from the input image; and
the indicating of the inference result comprises outputting a result of recognizing an object included in the input image.

11. The method of claim 10, wherein the outputting of the result of recognizing the object further comprises unlocking a mobile terminal, in response to an object included in the input image matching an object enrolled in the mobile terminal.

12. The method of claim 1, further comprising:
calculating an objective function value using a prediction term based on the compressed representation data and a target task and a compression term based on the feature data and the compressed representation data; and
updating a parameter of the drop layer based on the objective function value.

13. A non-transitory computer-readable storage medium storing instructions that, when executed by a processor, cause the processor to perform the method of claim 1.

14. A processor-implemented method of training a neural network, the method comprising:
generating temporary compressed representation data by dropping a feature value of feature data extracted from a training input based on a drop probability corresponding to the feature value using a drop layer of the neural network;
calculating an objective function value using a prediction term based on the temporary compressed representation data and a target task and a compression term based on the feature data and the temporary compressed representation data; and
updating a parameter of the drop layer based on the objective function value.

15. The method of claim 14, wherein the updating of the parameter of the drop layer comprises updating the parameter of the drop layer based on a gradient descent scheme to minimize a sum of the prediction term and the compression term.

16. The method of claim 14, further comprising:
extracting feature data from input data using a first portion of the neural network;
generating compressed representation data of the extracted feature data by dropping a feature value from the extracted feature data at the drop layer of the neural network based on a drop probability corresponding to the feature value; and
indicating an inference result from the compressed representation data using a second portion of the neural network.

17. A computing apparatus, comprising:
a memory configured to store a neural network comprising a drop layer; and
a processor configured to:
extract feature data from input data using a first portion of the neural network, to generate compressed representation data of the extracted feature data by dropping a feature value from the extracted feature data at the drop layer based on a drop probability corresponding to the feature value;
indicate an inference result from the compressed representation data using a second portion of the neural network; and
determine whether to drop each feature value of the feature data based on a binomial distribution function with a drop probability corresponding to each feature value.

18. The computing apparatus of claim 17, wherein the drop probability is assigned based on a relevance to a target task.

19. The computing apparatus of claim 17, wherein the processor is further configured to drop a first feature value of the extracted feature data based on a first drop probability of the drop layer and to drop a second feature value of the extracted feature data based on a second drop probability, different than the first probability, of the drop layer.

20. The computing apparatus of claim 17, wherein the processor is further configured to drop each of a plurality of feature values of the feature data at the drop layer, in response to a drop probability assigned to each of the plurality of feature values meeting a threshold, and to preserve each of the plurality of feature values in the drop layer, in response to a drop probability assigned to each of the plurality of feature values failing to meet the threshold.

21. The computing apparatus of claim 20, wherein the processor is further configured to adjust preserved feature values based on a number of feature values dropped from the feature data by the drop layer.

22. The computing apparatus of claim 17, further comprising:
a camera configured to receive an input image, wherein the processor is further configured to extract the feature data from the input image, and to output a result of recognizing an object included in the input image.

23. The computing apparatus of claim 22, wherein the computing apparatus is a mobile terminal and the processor is further configured to unlock the mobile terminal, in response to an object included in the input image matching an object enrolled in the mobile terminal.

* * * * *